United States Patent
Zeng et al.

(10) Patent No.: US 9,185,611 B2
(45) Date of Patent: Nov. 10, 2015

(54) METHOD AND DEVICE FOR OBTAINING SECONDARY TIMING ADVANCE

(71) Applicant: Huawei Technologies Co., Ltd., Shenzhen, Guangdong (CN)

(72) Inventors: Qinghai Zeng, Shanghai (CN); Qufang Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 76 days.

(21) Appl. No.: 14/041,829

(22) Filed: Sep. 30, 2013

(65) Prior Publication Data

US 2014/0029575 A1   Jan. 30, 2014

Related U.S. Application Data

(63) Continuation of application No. PCT/CN2012/073469, filed on Apr. 1, 2012.

(30) Foreign Application Priority Data

Apr. 2, 2011   (CN) .......................... 2011 1 0084167

(51) Int. Cl.
*H04W 36/00* (2009.01)
*H04W 74/08* (2009.01)
*H04W 56/00* (2009.01)

(52) U.S. Cl.
CPC ...... *H04W 36/0072* (2013.01); *H04W 56/0045* (2013.01); *H04W 74/0833* (2013.01)

(58) Field of Classification Search
None
See application file for complete search history.

(56) References Cited

U.S. PATENT DOCUMENTS 8,717,972 B2 * 5/2014 Cheng et al. .................. 370/324
8,917,605 B2 * 12/2014 Pelletier et al. ............... 370/236
8,934,459 B2 * 1/2015 Marinier et al. .............. 370/336
(Continued)

FOREIGN PATENT DOCUMENTS

CN   101646234 A   2/2010
CN   101686557 A   3/2010
(Continued)

OTHER PUBLICATIONS

"CA support for multi-TA," 3GPP TSG-RAN2#69, San Francisco, U.S.A., R2-101567, 3$^{rd}$ Generation Partnership Project, Valbonne, France (Feb. 22-26, 2010).
(Continued)

*Primary Examiner* — Hong Cho
(74) *Attorney, Agent, or Firm* — Leydig, Voit & Mayer, Ltd.

(57) ABSTRACT

Embodiments of the present invention provide a method and a device for obtaining a secondary timing advance. The method includes: after a secondary cell activation command is received or after a secondary cell is activated, if a secondary time alignment timer TAT of the secondary cell does not run, initiating, by a terminal, a random access procedure; and obtaining, by the terminal, the secondary TA according to a TA received in the random access procedure. With the method and the device for obtaining a timing advance according to embodiments of the present invention, a terminal initiates a random access procedure to obtain a secondary timing advance after the terminal receives a secondary cell activation command sent by a base station or after a secondary cell is activated, thereby saving signaling overhead and system resources.

14 Claims, 6 Drawing Sheets

(56) References Cited

U.S. PATENT DOCUMENTS

| | | | |
|---|---|---|---|
| 2009/0052388 A1* | 2/2009 | Kim et al. | 370/329 |
| 2010/0177747 A1* | 7/2010 | Chun et al. | 370/336 |
| 2011/0038361 A1* | 2/2011 | Park et al. | 370/350 |
| 2011/0103332 A1* | 5/2011 | Kuo | 370/329 |
| 2011/0134774 A1 | 6/2011 | Pelletier et al. | |
| 2011/0170535 A1* | 7/2011 | Wang et al. | 370/350 |
| 2011/0182200 A1 | 7/2011 | Wan et al. | |
| 2011/0200032 A1* | 8/2011 | Lindstrom et al. | 370/350 |
| 2012/0063425 A1 | 3/2012 | Wang et al. | |
| 2013/0322387 A1* | 12/2013 | Kim et al. | 370/329 |

FOREIGN PATENT DOCUMENTS

| | | |
|---|---|---|
| CN | 101827439 A | 9/2010 |
| CN | 101888648 A | 11/2010 |
| CN | 201967138 U | 9/2011 |
| EP | 2101538 A2 | 9/2009 |
| JP | 2013511916 A | 4/2013 |
| WO | 2010151213 A1 | 12/2010 |
| WO | WO 2011063244 A2 | 5/2011 |
| WO | WO 2012134534 A1 | 10/2012 |

OTHER PUBLICATIONS

"ETSI TS 136 321—LTE; Evolved Universal Terrestrial Radio Access (E-UTRA); Medium Access Control (MAC) protocol specification (3GPP TS 36.321 version 10.1.0 Release 10),"Version 10.1.0, 3$^{rd}$ Generation Partnership Project, Valbonne, France (Apr. 2011).

"Supporting Multiple Timing Advance Groups," 3GPP TSG-RAN WG2 meeting#68bis, Valencia, Spain, Agenda item 7.1.1, Document R2-100423, 3$^{rd}$ Generation Partnership Project, Valbonne, France (Jan. 18-22, 2010).

"The Multiple Time Advance in Carrier Aggregation," 3GPP TSG-RAN WG2 Meeting #73bis, Shanghai, China, Agenda item 7.1, Document R2-111953, 3$^{rd}$ Generation Partnership Project, Valbonne, France (Apr. 11-15, 2011).

"Support for Multiple Timing Advance in LTE CA," 3GPP TSG-RAN WG2 #74, Barcelona, Spain, Agenda item 7.1.1, Document R2-113255, 3$^{rd}$ Generation Partnership Project, Valbonne, France (May 9-13, 2011).

"R2-090257—When to Start Time Alignment Timer," 3GPP TSG-RAN WG2 Meeting #64bis, Jan. 12-16 2009, 3GPP, Valbonne, France.

"Technical Specification Group Radio Access Network; Evolved Universal Terrestrial Radio Access (E-UTRA) and Evolved Universal Terrestrial Radio Access Network (E-UTRAN); Overall Description; Stage 2 (Release 10)," V 10.2.0, Dec. 2010, 3GPP, Valbonne, France.

"Technical Specification Group Radio Access Network; Evolved Universal Terrestrial Radio Access (E-UTRA); Medium Access Control (MAC) Protocol Specification (Release 10)," V 10.0.0, Dec. 2010, 3GPP, Valbonne, France.

"LTE; Evolved Universal Terrestrial Radio Access (E-UTRA); Physical Layer Procedures (Release 10),"V 10.0.1, Jan. 2011, 3GPP, Valbonne, France.

International Search Report in corresponding PCT Patent Application No. PCT/CN2012/073469 (Jul. 5, 2012).

"RACH and carrier aggregation," 3GPP TSG RAN WG2, Meeting #68bis, San Francisco, California, R2-101285, 3$^{rd}$ Generation Partnership Project, Valbonne, France (Feb. 22-26, 2010).

* cited by examiner

METHOD AND DEVICE FOR OBTAINING SECONDARY TIMING ADVANCE

CROSS-REFERENCE TO RELATED APPLICATIONS

This application is a continuation of International Patent Application No. PCT/CN2012/073469, filed on Apr. 1, 2012, which claims priority to Chinese Patent Application No. 201110084167.7, filed on Apr. 2, 2011, both of which are hereby incorporated by reference in their entireties.

TECHNICAL FIELD

The present invention relates to the field of communication technologies, and in particular, to a method and a device for obtaining a secondary timing advance.

BACKGROUND

A long term evolution (Long Term Evolution, LTE) system is a next-generation wireless communication standard being formulated by the 3rd generation partnership project (The 3rd Generation Partnership Project, 3GPP). It has advantages such as high spectrum utilization and transmission speed, and low transmission delay. The terminal of an LTE system implements uplink transmission synchronization with a base station by using a timing advance (Timing Advance, TA), and maintains uplink synchronization by using a time alignment timer (Time Alignment Timer, TAT). With the introduction of a TA, uplink transmission of all terminals can be accomplished at the time expected by the base station, thereby avoiding collision between terminals during the uplink transmission and implementing time division multiplexing.

To provide a higher data rate, the base station may configure, for the terminal, one or more secondary cells (Secondary Cells, SCells) to assist a primary cell (Primary Cell, PCell) in data transmission. The primary cell and secondary cells correspond to an uplink carrier each, where transmission over different uplink carriers may need to use different TAs. The TA corresponding to a primary cell is known as a primary TA, and the TAT corresponding to a primary cell is known as a primary TAT; the TA corresponding to a secondary cell is known as a secondary TA, and the TAT corresponding to a secondary cell is known as a secondary TAT.

In the prior art, after a secondary cell is configured, if the secondary cell does not use an existing TA of a primary cell, a terminal obtains a secondary TA of the secondary cell by initiating random access in the secondary cell. This may increase signaling overhead in a random access procedure and a TA maintenance procedure and waste system resources.

SUMMARY

Embodiments of the present invention provide a method and a device for obtaining a secondary timing advance, which can reduce signaling overhead and save system resources during the obtaining of the secondary TA.

An embodiment of the present invention provides a method for obtaining a secondary timing advance, including:

after a secondary cell activation command is received or after a secondary cell is activated, if a secondary time alignment timer TAT of the secondary cell does not run, initiating, by a terminal, a random access procedure; and obtaining, by the terminal, a secondary timing advance TA of the secondary cell according to a TA received in the random access procedure.

An embodiment of the present invention provides another method for obtaining a secondary timing advance, including:

sending a secondary cell activation command to a terminal; and sending a TA to the terminal in a random access procedure according to random access initiated by the terminal, where the random access is initiated by the terminal if a secondary TAT of a secondary cell does not run after the terminal receives the secondary cell activation command or after it is confirmed according to the secondary cell activation command that the secondary cell is activated.

An embodiment of the present invention provides a method for processing uplink out-of-synchronization. The method includes: starting, by a terminal, a secondary TAT of a configured secondary cell; and, if the TAT of the secondary cell expires, notifying, by the terminal, a base station, and/or stopping uplink transmission on the secondary cell, and/or activating the secondary cell.

An embodiment of the present invention provides a terminal, including:

a receiving unit, configured to receive a secondary cell activation command;

a random access unit, configured to initiate a random access procedure if a secondary time alignment timer TAT of a secondary cell does not run after the receiving unit receives the secondary cell random access command or after the secondary cell is activated; and an obtaining unit, configured to obtain a secondary timing advance TA of the secondary cell according to a TA received in the random access procedure.

An embodiment of the present invention provides a base station, including:

a first sending unit, configured to send a secondary cell activation command to a terminal; and a second sending unit, configured to send a TA to the terminal in a random access procedure according to random access initiated by the terminal, where the random access is initiated by the terminal if a secondary TAT of a secondary cell does not run after the terminal receives the secondary cell activation command or after it is confirmed according to the secondary cell activation command that the secondary cell is activated.

An embodiment of the present invention provides a terminal, including: a starting unit, configured to start a secondary TAT according to an obtained secondary TA; and a processing unit, configured to: if the secondary TAT expires, notify expiry of the secondary TAT to a base station, and/or stop uplink transmission on a secondary cell corresponding to the secondary TAT, and/or deactivate the secondary cell corresponding to the secondary TAT.

With the method and the device for obtaining a secondary timing advance according to embodiments of the present invention, a terminal initiates a random access procedure to obtain a secondary timing advance after the terminal receives a secondary cell activation command or after a secondary cell is activated, thereby saving signaling overhead and system resources.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In embodiments of the present invention, a base station may be an evolved NodeB (evolved NodeB, eNB), a base station (Base Station, BS), a Node B, an access point (access point), or the like. The base station may be a macro base station, or a medium base station, or a micro base station such as a home base station. Each base station is capable of providing communication coverage for a specific geographic area. A term "cell (cell)" may be a coverage area of a base station, and/or a coverage area served by a base station subsystem, depending on the context where the term is used. A base station is capable of providing communication coverage for macro cells, pico cells (pico cells), femto cells (femto cells), and/or cells of other types.

In embodiments of the present invention, terminals may be distributed in an entire wireless network. Each terminal may be static or moving. A terminal (terminal) may be a user equipment (user equipment, UE), a mobile station (mobile station, MS), a subscriber unit (subscriber unit), a station (station), or the like. The terminal may also be a cellular phone (cellular phone), a personal digital assistant (personal digital assistant, PDA), a modem (modem), a wireless communication device, a handheld device (handheld), a laptop computer (laptop computer), a cordless phone (cordless phone), a wireless local loop (wireless local loop, WLL) station, or the like. The terminal is capable of communicating with a base station such as a macro base station, a pico base station, and a femto base station. The terminal may also be a communication device that communicates with a base station and plays a role similar to a terminal. For example, during initial network access, a relay node (relay node, RN) accesses a network as a terminal when the RN communicates with a base station.

Figure 1:
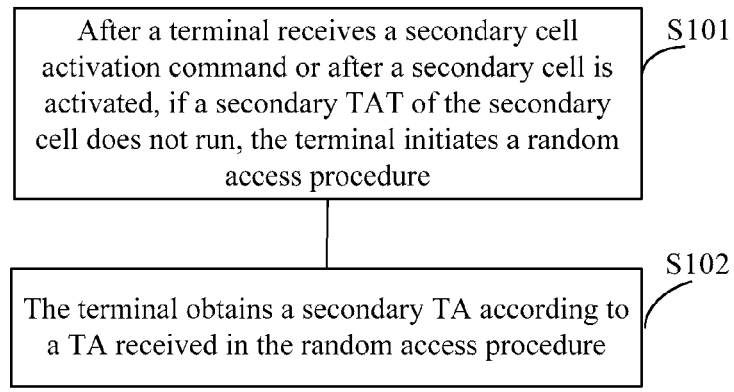
FIG. 1 is a flowchart of a method for obtaining a secondary timing advance according to an embodiment of the present invention.

FIG. 1 is a flowchart of a method for obtaining a secondary timing advance according to an embodiment of the present invention. As shown in FIG. 1, the method includes the following:

S101. After a terminal receives a secondary cell activation command or after a secondary cell is activated, if a secondary TAT of the secondary cell does not run, the terminal initiates a random access procedure, where the secondary TA of the secondary cell is different from a primary TA of a primary cell.

S102. The terminal obtains the secondary TA according to a TA received in the random access procedure.

A base station may carry a TA in a message 2 of the random access procedure sent to the terminal. After obtaining the TA, the terminal may start a TAT. During TAT running, the terminal is in an uplink synchronization state. In the embodiment of the present invention, the following may be further included: calibrating, by the base station, the TA by sending the timing advance command (Timing Advance Command) of a media access control (Medium Access Control, MAC) layer so that uplink transmission of the terminal is synchronized with the base station. The terminal restarts the TAT according to the calibrated TA value received in the TA command so that uplink transmission is synchronized with the base station.

In the embodiment of the present invention, the terminal receives the secondary cell activation command, where the secondary cell may have been activated or not have been activated. After receiving the secondary cell activation command, the terminal may, no matter whether the secondary cell has been activated or not, initiate a random access procedure if the secondary TAT of the secondary cell does not run. Or, after receiving the secondary cell activation command, the terminal may confirm that the secondary cell has been activated, and then initiate a random access procedure if the secondary TAT of the secondary cell does not run.

In this embodiment, the secondary TA of the secondary cell and the primary TA of the primary cell may be different, that is, they do not belong to the same TA group (TA Group, TAG). When there are multiple secondary cells, the secondary TAs of these secondary cells may be different from the primary TA of the primary cell. Additionally, the secondary TAs of these secondary cells may be the same. For example, if a secondary cell with a secondary TA different from the primary TA of the primary cell has a physical random access channel (Physical Random Access Channel, PRACH) resource, the terminal may use the secondary cell having the PRACH resource as a reference cell and initiate a random access procedure on this secondary cell. When there are multiple secondary cells with secondary TAs different from the primary TA of the primary cell, and the secondary TAs of the multiple secondary cells are the same, if at least one secondary cell among these secondary cells has a PRACH resource, the terminal may use the secondary cell having the PRACH resource as a reference cell and initiate a random access procedure on this secondary cell. The function of a reference cell is that during initiation of the random access procedure by the terminal, reference is made to a downlink carrier of the reference cell when the terminal sends a preamble (preamble).

In an embodiment of the present invention, after a terminal receives a secondary cell activation command or after a secondary cell is activated, if a secondary TAT of the secondary cell does not run, the terminal may initiate a random access procedure to obtain the secondary TA of the secondary cell. The terminal may immediately initiate a random access procedure actively if the secondary TAT of the secondary cell does not run after the secondary cell activation command is received or after the secondary cell is activated. Or, the terminal may not initiate random access actively, but initiate random access when triggered by a base station. For example, after the secondary cell activation command is received or after the secondary cell is activated, if the secondary TAT of the secondary cell does not run, the terminal may initiate a random access procedure according to a random access command after receiving the random access command. If the random access command sent by the base station specifies a reference cell, the terminal may initiate, according to the specified reference cell, the random access procedure on a secondary cell having a PRACH resource (that is, during initiation of random access by the terminal, reference is made to a downlink carrier of the reference cell specified by the base station, when the terminal sends a preamble). If the random access command does not specify a reference cell, the terminal may use the cell carrying the random access command as a reference cell, and initiate a random access procedure on the cell carrying the random access command. In an embodiment of the present invention, the terminal may also set a random access timer. In the case that the secondary TAT of the secondary cell does not run after a secondary cell activation command is received or after a secondary cell is activated, the terminal may initiate random access according to the reference cell specified in a random access command if a random access command is received within a duration set by the random access timer, or initiate a random access procedure on a cell carrying the random access command; if a random access command is not received within a duration set by the random access timer, the terminal may use the secondary cell as a reference cell and initiate a random access procedure on this secondary cell. That is, with the random access timer, the terminal first waits for a period set by the random access timer. If a random access command is received within the set period, the terminal initiates a random access procedure according to the random access command; if a random access command is not received within the set period, the terminal initiates a random access command after the set period expires.

When the terminal initiates random access on the secondary cell to obtain the secondary TA, the secondary TA may be a TA received by the terminal in the random access procedure. For example, the base station may send a message 2 (message 2) of the random access procedure, namely, a response message of the random access procedure, to the terminal in the random access procedure, where the message 2 carries a TA. Understandably, in an embodiment of the present invention, a base station may also carry a TA in another message sent to the terminal in the random access procedure.

Additionally, in the embodiment of the present invention, the terminal may use the primary cell as a reference cell and initiate a random access procedure on a secondary cell. In this case, the secondary TA obtained by the terminal may not be the TA sent in the random access procedure. The secondary TA obtained by the terminal may be a sum of the secondary TA sent by the base station, which is a TA received in the random access procedure, and a difference between a downlink carrier timing value of the secondary cell and a downlink carrier timing value of the primary cell. Or, the secondary TA obtained by the terminal may be a difference between twice the TA received in the random access procedure and the TA of the primary cell. Similarly, the base station may carry a TA in the message 2 of the random access procedure sent to the terminal in the random access procedure, or carry a TA in another message sent to the terminal in the random access procedure.

In an embodiment of the present invention, when none of the secondary cells of the terminal has a PRACH resource, the terminal may use a secondary cell as a reference cell and initiate a random access procedure on the primary cell. In this case, the secondary TA obtained by the terminal may be a sum of the TA sent by the base station in the random access procedure and a difference between a downlink carrier timing value of the secondary cell and a downlink carrier timing value of the primary cell; or, the secondary TA obtained by the terminal may be a difference between twice the TA received in the random access procedure and the TA of the primary cell.

In the method for obtaining a secondary timing advance according to this embodiment, when the secondary TA of the secondary cell needs to be obtained, the terminal may, instead of initiating a random access procedure arbitrarily, initiate a random access procedure to obtain the secondary timing advance after a secondary cell activation command is received or after a secondary cell is activated. This can avoid unnecessary signaling overhead and system resource waste in the random access procedure and a TA maintenance procedure when the secondary cell is in a deactivated state, thereby saving signaling overhead and system resources.

Figure 2:
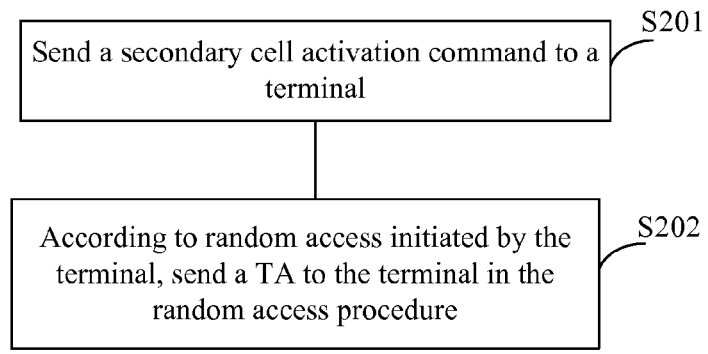
FIG. 2 is a flowchart of a method for obtaining a secondary timing advance according to another embodiment of the present invention.

FIG. 2 is a flowchart of a method for obtaining a secondary timing advance according to another embodiment of the present invention. As shown in FIG. 2, the method includes the following:

S201. Send a secondary cell activation command to a terminal.

S202. Send a TA to the terminal in a random access procedure according to random access initiated by the terminal, where: the random access is initiated by the terminal if a secondary TAT of a secondary cell does not run after a secondary cell activation command is received or after it is confirmed according to the secondary cell activation command that the secondary cell is activated; and a secondary TA of the secondary cell is different from a primary TA of a primary cell.

In this embodiment, a TA is sent to the terminal through the random access procedure so that the terminal obtains the secondary TA.

The executor of the above steps may be a base station.

In the embodiment of the present invention, the base station sends a secondary cell activation command to the terminal, and the terminal may initiate a random access procedure to obtain the secondary TA of the secondary cell if the secondary TAT of the secondary cell does not run after the secondary cell activation command is received or after the secondary cell is activated.

In this embodiment, the terminal may use a secondary cell having a PRACH resource as a reference cell and initiate a random access procedure on the secondary cell. The secondary TA obtained by the terminal may be a TA sent to the terminal by the base station in the random access procedure.

Or, the terminal may use the primary cell as a reference cell and initiate a random access procedure on the secondary cell. Or, when none of the secondary cells of the terminal has a PRACH resource, the terminal may use a secondary cell as a reference cell and initiate a random access procedure on the primary cell. In this embodiment, for the terminal to initiate a random access procedure, reference may be made to the method embodiment shown in FIG. 1.

Figure 3:
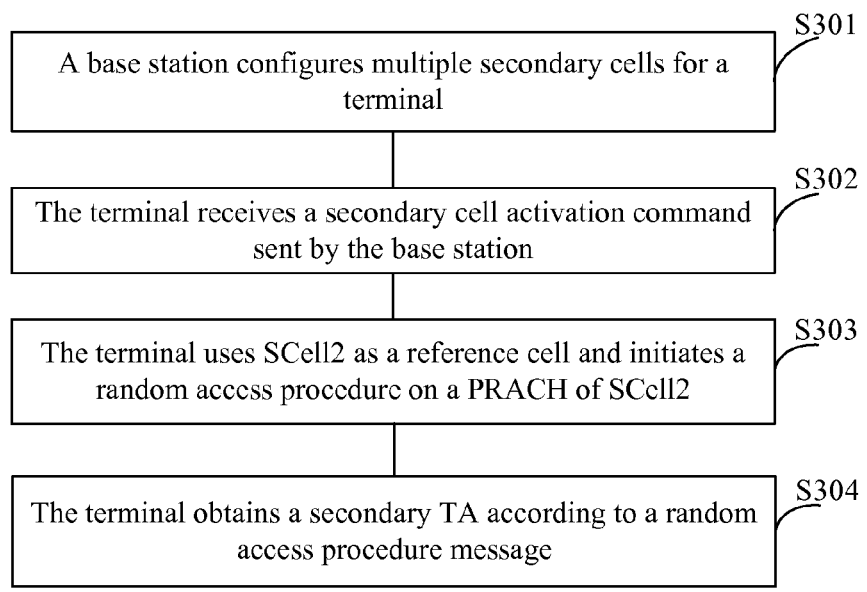
FIG. 3 is a flowchart of a method for obtaining a secondary timing advance according to still another embodiment of the present invention.

FIG. 3 is a flowchart of a method for obtaining a secondary timing advance according to still another embodiment of the present invention. As shown in FIG. 3, after a secondary cell activation command is received or after a secondary cell is activated, if a secondary TAT of the secondary cell does not run, the terminal uses the secondary cell as a reference cell and initiates a random access procedure on the secondary cell to obtain the secondary TA of the secondary cell. It should be noted that, for multiple secondary cells with the same secondary TA, at least one secondary cell should have a PRACH resource so that the terminal may initiate a random access procedure on the secondary cell having a PRACH resource.

S301. A base station configures multiple secondary cells for a terminal.

In this embodiment, for example, there are two secondary cells: SCell1 and SCell2; SCell1 and a primary cell belong to the same TA group, TAG1; and SCell2 belongs to another TA group, TAG2. Because SCell2 does not use the primary TA, the terminal needs to obtain a secondary TA corresponding to SCell2, that is, TA2. Additionally, the base station may indicate that SCell2 has a PRACH resource.

S302. The terminal receives a secondary cell activation command sent by the base station.

For example, the base station may carry the secondary cell activation command in an activation/deactivation MAC control element (Activation/Deactivation MAC Control Element).

This secondary cell activation command may be used to activate both secondary cells SCell1 and SCell2.

S303. The terminal uses SCell2 as a reference cell and initiates a random access procedure on a PRACH of SCell2.

After activating SCell2, if the terminal finds that the secondary TAT of SCell2, TAT2, does not run, the terminal may initiate a random access procedure to obtain the secondary TA of SCell, namely, TA2. The terminal uses SCell2 as a reference cell, that is, the terminal uses a downlink carrier of SCell2 for reference. When the terminal selects a PRACH of an uplink subframe n of SCell2 to send a preamble, the time when the preamble starts to be sent is the time when a downlink subframe n corresponding to the SCell2 starts to be received, where n may be a non-negative integer identifying a subframe, or may be a symbol or a character that is used to identify the subframe.

S304. The terminal obtains a secondary TA according to a message in the random access procedure.

The terminal receives a message 2 of the random access procedure sent by the base station, where the message 2 of the random access procedure carries a TA. Then, TA2 obtained by the terminal may be the TA carried in the message 2 so that the terminal may start the TAT2.

In this embodiment, the process for obtaining a secondary TA of the secondary cell SCell2, which does not use the primary TA, is provided. If the base station also configures, for the terminal, another secondary cell that belongs to the same TA group as SCell2, a TA of another secondary cell can be obtained by using the method provided in this embodiment. If the base station also configures, for the terminal, another secondary cell that does not belong to the same TA group as SCell2, when the corresponding secondary TAT does not run after the another secondary cell is activated, the terminal also needs to initiate a random access procedure on a secondary cell having a PRACH resource to obtain the secondary TA corresponding to the another secondary cell.

It should be noted that in this embodiment, when the terminal actively initiates a random access procedure, the terminal needs to contend for a PRACH resource with other terminals. Therefore, the random access procedure may fail. If the terminal fails to initiate a random access procedure, the terminal may continue to use SCell2 as a reference cell and initiate a random access procedure on the PRACH of SCell2 until the random access succeeds or the number of random access attempts exceeds a maximum value.

Figure 4:
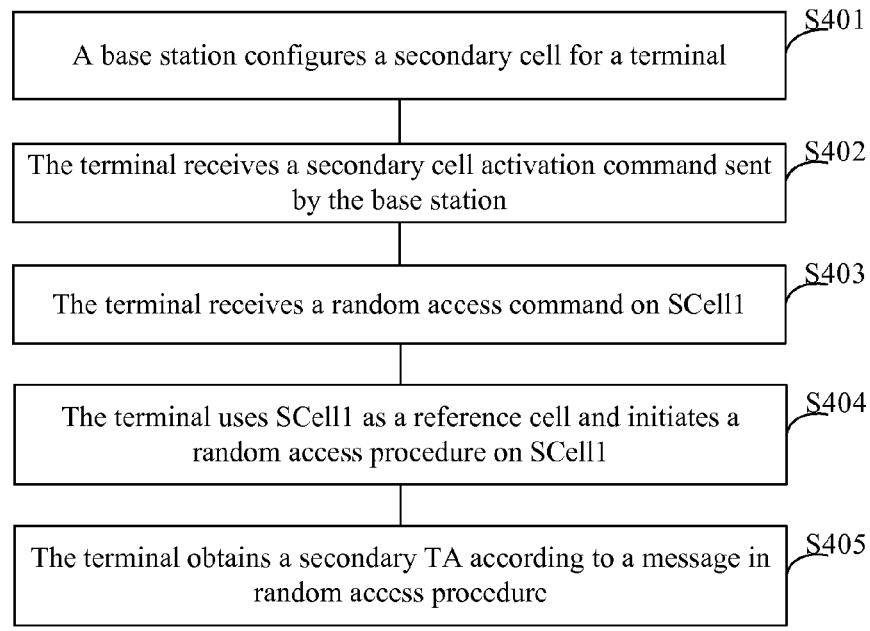
FIG. 4 is a flowchart of a method for obtaining a secondary timing advance according to still another embodiment of the present invention.

FIG. 4 is a flowchart of a method for obtaining a secondary timing advance according to still another embodiment of the present invention. As shown in FIG. 4, in this embodiment, after a secondary cell activation command is received or after a secondary cell is activated, if a secondary TAT of the secondary cell does not run, the terminal does not immediately initiate random access. Instead, after the terminal receives a random access command sent by a base station, the terminal may use a cell carrying the random access command as a reference cell and initiate a random access procedure on this reference cell to obtain a secondary TA of the secondary cell. It should be noted that the secondary cell carrying the random access command has a PRACH resource so that the terminal may initiate a random access procedure on the secondary cell.

S401. A base station configures a secondary cell for a terminal.

In this embodiment, the base station may configure a secondary cell SCell1 for the terminal, and indicate that SCell1 does not belong to the same TA group as a primary cell PCell but belongs to another TA group, TAG2. Additionally, the base station indicates that SCell1 has a PRACH resource.

S402. The terminal receives a secondary cell activation command sent by the base station.

This command is used to activate the secondary cell SCell1.

S403. The terminal receives a random access command on SCell1.

The random access command received by the terminal may be, for example, a physical downlink control channel order (Physical Downlink Control Channel Order, PDCCH order). Because the base station indicates that SCell1 has a PRACH resource, the base station may use a random access command to trigger the terminal to initiate a random access procedure on SCell1.

S404. The terminal uses SCell1 as a reference cell and initiates a random access procedure on SCell1.

S405. The terminal obtains a secondary TA according to a message in the random access procedure.

The terminal receives a message 2 of the random access procedure sent by the base station, where the message 2 of the random access procedure carries a TA. The secondary TA of the Scell obtained by the terminal is the TA carried in the message 2 so that the terminal may start a secondary TAT corresponding to the SCell.

Figure 5:
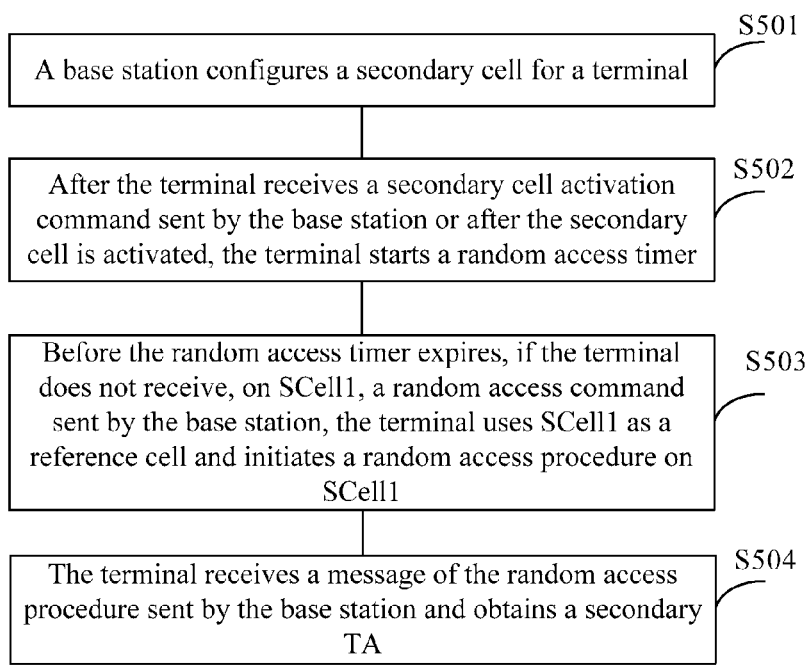
FIG. 5 is a flowchart of a method for obtaining a secondary timing advance according to still another embodiment of the present invention.

FIG. 5 is a flowchart of a method of obtaining a secondary timing advance according to still another embodiment of the present invention. As shown in FIG. 5, in this embodiment, after a secondary cell activation command is received or after a secondary cell is activated, if a secondary TAT of the secondary cell does not run, a terminal starts a random access timer. If, before the random access timer expires, the terminal receives a random access command used to obtain a TA of the secondary cell and sent by a base station, the terminal stops the timer, and initiates, according to the random access command sent by the base station, random access on a secondary cell carrying the command or a cell specified in the random access command; if, before the random access timer expires, the terminal does not receive a random access command sent by the base station, the terminal may use the secondary cell as a reference cell and initiate a random access procedure to obtain a corresponding TA under a prerequisite that the secondary cell for initiating a random access procedure has a PRACH resource.

S501. A base station configures a secondary cell for a terminal.

In this embodiment, the base station may configure a secondary cell SCell1 for the terminal, and indicate that SCell1 does not belong to the same TA group as a primary cell PCell but belongs to another TA group, TAG2. Additionally, the base station indicates that SCell1 has a PRACH resource.

S502. After the terminal receives a secondary cell activation command sent by the base station or after the secondary cell is activated, the terminal starts a random access timer.

The secondary cell activation command is used to activate the secondary cell SCell1.

S503. Before the random access timer expires, if the terminal does not receive, on SCell1, a random access command sent by the base station, the terminal uses SCell1 as a reference cell and initiates a random access procedure on SCell1.

S504. The terminal receives a message of the random access procedure sent by the base station and obtains a secondary TA.

The terminal receives a message 2 of the random access procedure sent by the base station, where the message 2 of the random access procedure carries a TA. The secondary TA of the Scell obtained by the terminal may be the TA carried in the message 2 so that the terminal may start a secondary TAT corresponding to the Scell.

It should be noted that if, before the random access timer expires, the terminal receives a random access command sent by the base station for TAG2, and if the random access command clearly specifies the reference cell or the TA that needs to be obtained, the terminal may use the cell specified in the random access command as a reference cell, and initiate a random access procedure on a secondary cell corresponding to the secondary TA that needs to be obtained in the TA, under the prerequisite that the secondary cell for initiating the random access procedure has a PRACH resource. If the random access command does not clearly specify the reference cell, the terminal may use the cell carrying the random access command as a reference cell and initiate a random access procedure on the reference cell to obtain the secondary TA.

Figure 6:
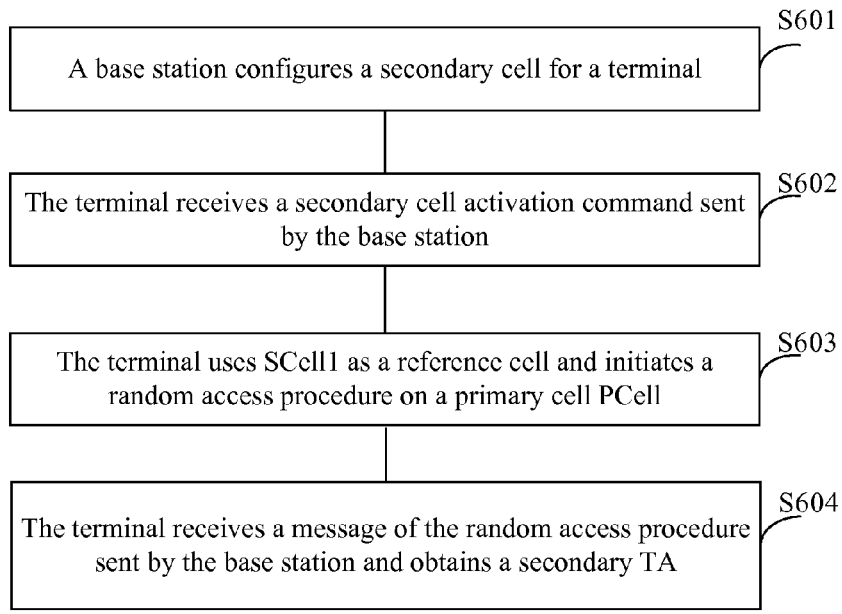
FIG. 6 is a flowchart of a method for obtaining a secondary timing advance according to still another embodiment of the present invention.

FIG. 6 is a flowchart of a method for obtaining a secondary timing advance according to still another embodiment of the present invention. As shown in FIG. 6, in this embodiment, after a secondary cell activation command is received or after a secondary cell is activated, the secondary cell does not have a PRACH resource. If a secondary TAT of the secondary cell does not run, a terminal may use the secondary cell as a reference cell and initiate a random access procedure on a primary cell to obtain a TA, where, secondary TA=TA_msg2+delta or 2*TA_msg2−TA_pcell. TA_msg2 is a TA carried in a message 2 of the random access procedure; delta is a difference between a downlink carrier timing value of a secondary cell and a downlink carrier timing value of a primary cell; and TA_pcell is a TA of the primary cell.

S601. A base station configures a secondary cell for a terminal.

In this embodiment, the base station configures a secondary cell SCell1 for the terminal, and indicates that SCell1 does not belong to the same TA group as a primary cell PCell but belongs to another TA group, TAG2.

S602. The terminal receives a secondary cell activation command sent by the base station.

This secondary cell activation command may be used to activate the secondary cell SCell1.

S603. The terminal uses SCell1 as a reference cell and initiates a random access procedure on the primary cell PCell.

After the terminal receives the secondary cell activation command sent by the base station or after the SCell1 is activated, if the terminal finds that a secondary TAT of SCell1 does not run, the terminal may initiate a random access procedure to obtain the secondary TA of Scell. The terminal uses SCell1 as a reference cell, that is, the terminal uses a downlink carrier of SCell1 for reference. When the terminal selects a PRACH of an uplink subframe n of PCell to send a preamble, the time when the preamble starts to be sent is the time when a downlink subframe n corresponding to SCell1 starts to be received, where n may be a non-negative integer identifying a subframe or may be a symbol or a character that is used to identify the subframe.

S604. The terminal receives a message of the random access procedure sent by the base station and obtains a secondary TA.

The terminal receives the message 2 of the random access procedure sent by the base station, and calculates the secondary TA of according to a TA carried in the message 2 of the random access procedure so that the secondary TAT of Scell may be started.

Figure 7:
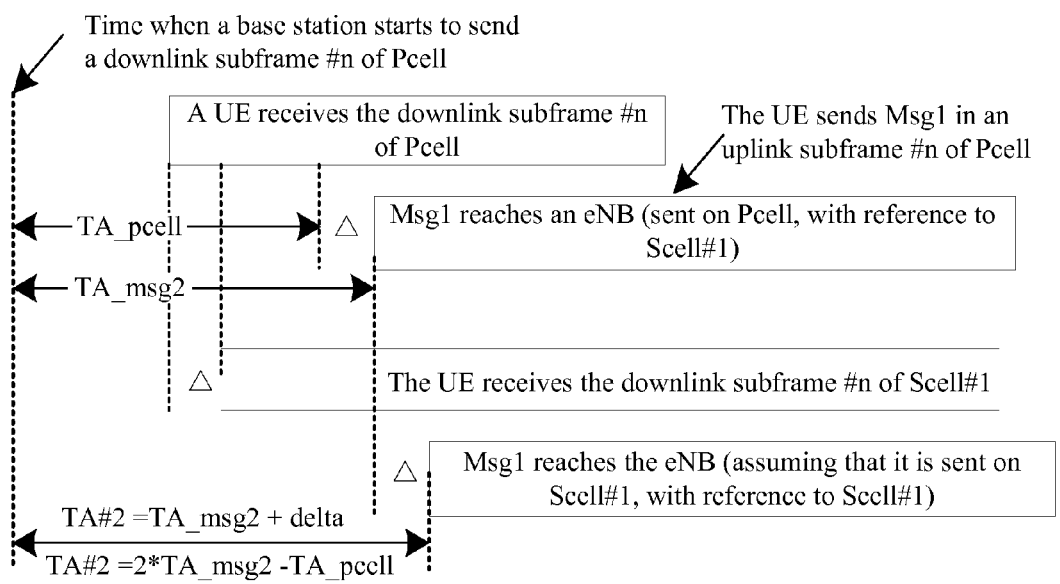
FIG. 7 is a schematic diagram of obtaining a secondary TA in an embodiment provided in FIG. 6.

FIG. 7 is a schematic diagram of obtaining a secondary TA according to an embodiment provided in FIG. 6. FIG. 7 shows a method for calculating TA2.

In FIG. 7, Msg1 is a message 1 (message 1) in the random access procedure, where the message 1 may include a preamble; and an eNB is an evolved base station (evolved NodeB).

TA2=TA_msg2+delta or TA2=2×TA_msg2−TA_pcell, where, TA_msg2 is a TA carried in a message 2 of the random access procedure; delta is a difference between a downlink carrier timing value of a secondary cell and a downlink carrier timing value of a primary cell; and TA_pcell is a TA of the primary cell.

Figure 8:
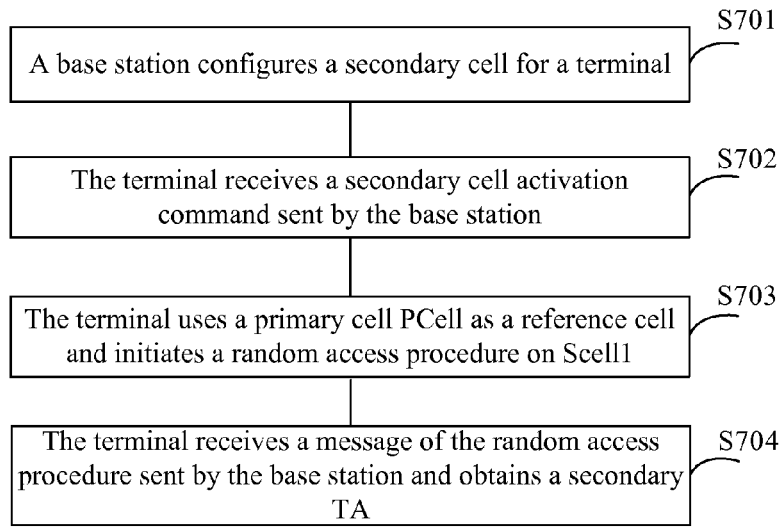
FIG. 8 is a flowchart of a method for obtaining a secondary timing advance according to still another embodiment of the present invention.

FIG. 8 is a flowchart of a method for obtaining a secondary timing advance according to still another embodiment of the present invention. As shown in FIG. 8, in this embodiment, after a secondary cell activation command is received or after a secondary cell is activated, if a secondary TAT of the secondary cell does not run, the terminal uses a primary cell as a reference cell and initiates a random access procedure on the secondary cell to obtain a TA. Secondary TA=TA_msg2+delta or 2*TA_msg2−TA_pcell, where, TA_msg2 is a TA carried in a message 2 of the random access procedure; delta is a difference between a downlink carrier timing value of a secondary cell and a downlink carrier timing value of a primary cell; and TA_pcell is a TA of the primary cell.

S701. A base station configures a secondary cell for a terminal.

In this embodiment, the base station may configure a secondary cell SCell1 for the terminal, and indicate that the SCell1 does not belong to the same TA group as a primary cell PCell but belongs to another TA group, TAG2.

S702. The terminal receives a secondary cell activation command sent by the base station.

This command is used to activate the secondary cell SCell1.

S703. The terminal uses the primary cell PCell as a reference cell and initiates a random access procedure on SCell1.

After the terminal receives the secondary cell activation command sent by the base station or after SCell1 is activated, if the terminal finds that a secondary TAT of SCell1 does not run, the terminal may initiate a random access procedure to obtain the secondary TA of Scell. The terminal uses PCell as a reference cell, that is, the terminal uses a downlink carrier of PCell for reference. When the terminal selects a PRACH of an uplink subframe n of SCell1 to send a preamble (preamble), the time when the preamble starts to be sent is the time when a downlink subframe n corresponding to PCell starts to be received, where n may be a non-negative integer identifying a subframe or may be a symbol or a character that is used to identify the subframe.

S704. The terminal receives a message of the random access procedure sent by the base station and obtains a secondary TA.

The terminal receives the message 2 of the random access procedure sent by the base station, and obtains the secondary TA2 of Scell1 according to a TA carried in the message 2 of the random access procedure so that the secondary TAT of Scell may be started.

Figure 9:
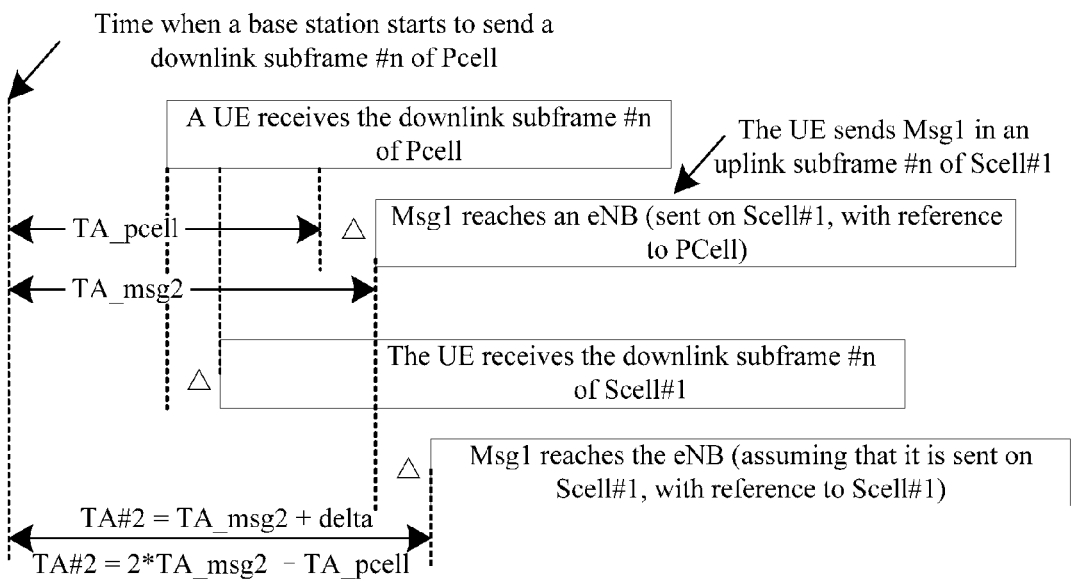
FIG. 9 is a schematic diagram of obtaining a secondary TA in an embodiment provided in FIG. 8.

FIG. 9 is a schematic diagram of obtaining a secondary TA according to an embodiment provided in FIG. 8. FIG. 9 shows a method for calculating TA2.

In FIG. 9, Msg1 is a message 1 of the random access procedure, where the message 1 may include a preamble; and an eNB is an evolved base station (evolved NodeB).

TA2=TA_msg2+delta, or TA2=2×TA_msg2−TA_pcell, or TA2=TA_pcell+2×delta, where, TA_msg2 is a TA specified in the message 2 of the random access procedure; delta is a difference between a downlink carrier timing value of a secondary cell and a downlink carrier timing value of a primary cell; and TA_pcell is a TA of the primary cell.

In the prior art, if the secondary TAT expires, the terminal may refresh buffers (buffer) of all uplink hybrid automatic repeat requests (Hybrid Automatic Repeat Request, HARQ), clear semi-statically scheduled uplink and downlink resources, and notify a radio resource control (Radio Resource Control, RRC) layer to release physical uplink control channel (Physical Uplink Control Channel, PUCCH) and/or sounding reference signal (Sounding Reference Signal, SRS) resources. However, this may cause the PUCCH, SRS, and semi-statically scheduled resources to be incorrectly released, which further affects data transmission. Moreover, before the base station learns uplink out-of-synchronization of the secondary cell, the base station may continue to schedule the out-of-synchronization secondary cell. As a result, resources are wasted, and uplink collision may occur due to the application of an invalid secondary TA.

Figure 10:
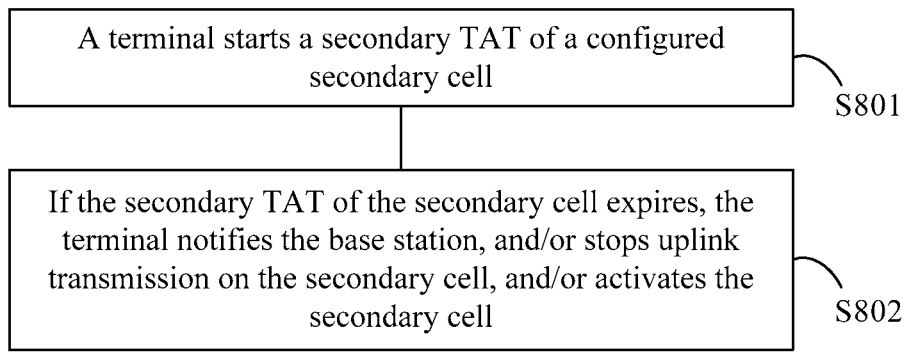
FIG. 10 is a flowchart of a method for processing uplink out-of-synchronization according to an embodiment of the present invention.

An embodiment of the present invention further provides a method for solving the problems in the prior art where data transmission is affected by incorrect releasing of the PUCCH, SRS, and semi-statically scheduled resources, and resource waste and uplink collision are caused by scheduling an out-of-synchronization secondary cell by the base station. FIG. 10 is a flowchart of a method for processing uplink out-of-synchronization according to the present invention. As shown in FIG. 10, the method specifically includes the following.

S801. A terminal starts a secondary TAT of a configured secondary cell.

S802. If the secondary TAT of the secondary cell expires, the terminal notifies a base station, and/or stops uplink transmission on the secondary cell, and/or activates the secondary cell.

In the embodiment of the present invention, the terminal may, for example, obtain a secondary TA of the secondary cell according to the foregoing method embodiment of obtaining a secondary timing advance, so that the secondary TAT of the secondary cell is started.

For example, the base station configures secondary cells SCell and SCell2 for the terminal, activates SCell and SCell2, and indicates, in a configuration message, that SCell and SCell2 belong to TAG2; and the terminal starts the secondary TAT of SCell and SCell2, that is, TAT2. If TAT2 expires, the terminal notifies the base station, and/or stops all uplink transmission on SCell1 and SCell2, and/or deactivates SCell1 and SCell2.

By using RRC signaling (which may be newly defined RRC signaling) or a media access control component element (Media Access Control Component Element, MAC CE), or physical layer (Physical, PHY) signaling, the terminal may notify, on the primary cell or other secondary cell of uplink synchronization, the base station that the uplink out-of-synchronization occurs caused by TAT2 expiry. The terminal may also stop all uplink transmission, specifically including the transmission of a physical uplink shared channel PUSCH, a physical uplink control channel PUCCH, and a Sounding reference signal SRS, so as to avoid resource waste and possible uplink collision.

It should be noted that this method may be used in combination with the method for obtaining a secondary timing advance according to the embodiment of the present invention, so as to save signaling overhead and system resources and avoid resource waste and possible uplink collision.

A person of ordinary skill in the art may understand that all or a part of the processes of the methods in the embodiments may be implemented by a computer program instructing relevant hardware or by a chip or a processor. The program may be stored in a computer readable storage medium. When the program runs, the processes of the methods in the embodiments are performed. The storage medium may be a magnetic disk, an optical disk, a read-only memory (Read-Only Memory, ROM), or a random access memory (Read-Only Memory, RAM).

Figure 11:
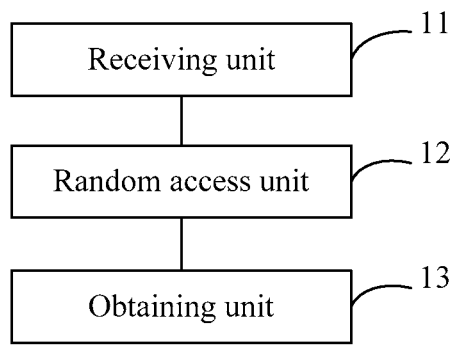
FIG. 11 is a schematic structural diagram of a terminal according to an embodiment of the present invention.

FIG. 11 is a structural schematic diagram of a terminal according to an embodiment of the present invention. The terminal provided in the embodiment of the present invention may be applied to the foregoing method embodiments of the present invention. As shown in FIG. 11, the terminal includes a receiving unit 11, a random access unit 12, and an obtaining unit 13.

The receiving unit 11 is configured to receive a secondary cell activation command, where a secondary timing advance TA of a secondary cell is different from a primary TA of a primary cell.

The random access unit 12 is configured to initiate a random access procedure if a secondary time alignment timer TAT of the secondary cell does not run after the receiving unit 11 receives the secondary cell random access command or after the secondary cell is activated.

The obtaining unit 13 is configured to obtain the secondary TA according to a TA received in the random access procedure.

After the receiving unit 11 receives the secondary cell activation command sent by a base station or after a secondary cell is activated, if the secondary TAT of the secondary cell does not run, the random access unit 12 may initiate a random access procedure to obtain the secondary TA of the secondary cell. The random access unit 12 may immediately initiate random access actively if the secondary TAT of the secondary cell does not run after the receiving unit 11 receives the secondary cell activation command sent by the base station or after the secondary cell is activated. Or, the random access unit 12 may, instead of actively initiating random access, initiate random access when triggered by the base station, for example, the random access unit 12 may initiate a random access procedure according to the random access command after the terminal receives a random access command. Or, the random access unit 12 may further determine random access according to a duration set by a set random access timer. If the terminal receives a random access command within the duration set by the random access timer, the random access unit 12 may initiate random access according to the reference cell specified in the random access command or initiate random access on a cell carrying the random access command; if a random access command is not received within the duration set by the random access timer, the random access unit 12 may use a secondary cell as a reference cell and initiate random access on the secondary cell.

If a secondary cell that does not belong to the same TA group as the primary cell has a PRACH resource, or at least one secondary cell among multiple secondary cells whose secondary TA does not belong to the same TA group as the primary TA of the primary cell has a PRACH resource, the random access unit 12 may use the secondary cell having a PRACH resource as a reference cell and initiate a random access procedure on the secondary cell.

The random access procedure initiated by the random access unit 12 may be actively initiated, or initiated as triggered by the base station. The receiving unit 11 may further receive the random access command sent by the base station. For example, the random access unit 12 initiates a random access procedure according to the received random access command sent by the base station. The random access unit 12 may initiate, according to the specified reference cell, a random access procedure on a secondary cell having a PRACH resource, or may use a cell carrying the random access command as a reference cell and initiate a random access procedure on the cell carrying the random access command. Additionally, the terminal may include a random access timer. If a random access command sent by the base station is not received within the duration set by the random access timer, the random access unit 12 may still use the secondary cell as a reference cell and initiate a random access procedure on the secondary cell. When random access is initiated on the secondary cell, the secondary TA obtained by the obtaining unit 13 may be a TA received in the random access procedure.

Additionally, the random access unit 12 may also use the primary cell as a reference cell and initiate a random access procedure on the secondary cell. In this case, the secondary TA obtained by the obtaining unit 13 may not be a TA sent by the base station in the random access procedure; the secondary TA obtained by the terminal may be a sum of the secondary TA sent by the base station, which is a TA received in the random access procedure, and a difference between a downlink carrier timing value of a secondary cell and a downlink carrier timing value of a primary cell. Or, the secondary TA obtained by the obtaining unit 13 may be a difference between twice the TA received in the random access procedure and the TA of the primary cell.

When none of the secondary cells of the terminal has a PRACH resource, the random access unit 12 may still use the secondary cell as a reference cell and initiate a random access procedure on the primary cell. In this case, the secondary TA obtained by the obtaining unit 13 may be a sum of the TA sent by the base station in the random access procedure and a difference between a downlink carrier timing value of the secondary cell and a downlink carrier timing value of the primary cell; or, the secondary TA obtained by the obtaining unit 13 may be a difference between twice the TA received in the random access procedure and the TA of the primary cell.

In the embodiment, after the terminal receives a secondary cell activation command sent by the base station or after a secondary cell is activated, the terminal initiates a random access procedure to obtain a secondary timing advance, thereby saving signaling overhead and system resources.

Figure 12:
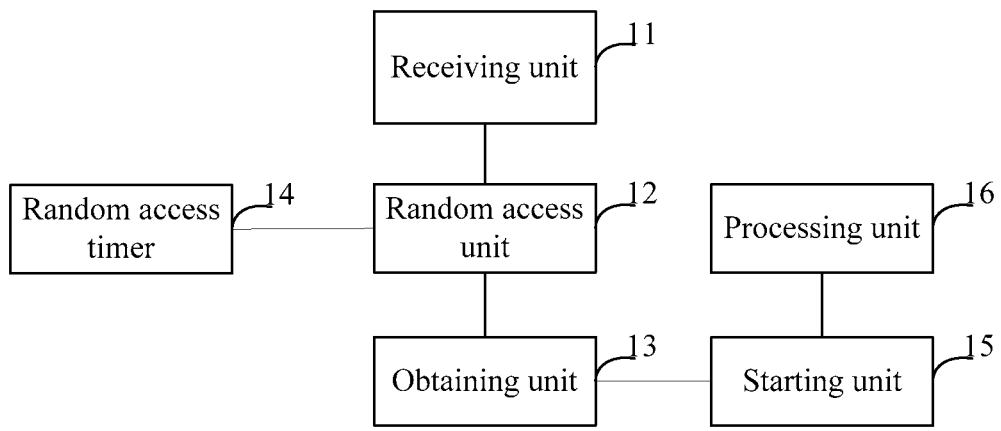
FIG. 12 is a schematic structural diagram of a terminal according to another embodiment of the present invention.

FIG. 12 is a structural schematic diagram of a terminal according to another embodiment of the present invention. The terminal provided in the embodiment of the present invention may be applied to the foregoing method embodiments of the present invention. As shown in FIG. 12, the terminal includes a receiving unit 11, a random access unit 12, and an obtaining unit 13.

Further, the random access unit 12 is specifically configured to use a secondary cell as a reference cell and initiate a random access procedure on the secondary cell.

The receiving unit 11 is further configured to receive a random access command sent by a base station.

If the random access command received by the receiving unit 11 specifies a reference cell, accordingly, the random access unit 12 may be configured to initiate a random access procedure on the secondary cell according to the reference cell specified in the random access command.

The random access unit 12 is further configured to use a cell carrying the random access command as a reference cell and initiate a random access procedure on the cell carrying the random access command.

The terminal provided in the embodiment may further include a random access timer 14, which is started after the receiving unit 11 receives a secondary cell activation command sent by the base station or after the secondary cell is activated.

The random access unit 12 is specifically configured to: if a random access command sent by the base station is not received within a duration set by the random access timer 14, use a secondary cell as a reference cell and initiate a random access procedure on the secondary cell.

The secondary TA obtained by the obtaining unit 13 is a TA received in the random access procedure.

The random access unit 12 is further configured to use the primary cell as a reference cell and initiate a random access procedure on the secondary cell; or, use the secondary cell as a reference cell and initiate a random access procedure on the primary cell.

Accordingly, the secondary TA obtained by the obtaining unit 13 is a sum of the TA received in the random access procedure and a difference between a downlink carrier timing value of the secondary cell and a downlink carrier timing value of the primary cell; or, is a difference between twice the TA received in the random access procedure and the TA of the primary cell.

The random access unit 12 is further configured to, during initiation of the random access procedure, use the downlink carrier of the reference cell for reference when sending a preamble.

The terminal provided in the embodiment of the present invention may further include a starting unit 15 and a processing unit 16.

The starting unit 15 is configured to start a secondary TAT according to the secondary TA obtained by the obtaining unit 13.

The processing unit 16 is configured to: if the secondary TAT expires, notify the base station that the secondary TAT expires, and/or stop uplink transmission on the secondary cell corresponding to the secondary TAT, and/or deactivate the secondary cell corresponding to the secondary TAT.

The embodiment of the present invention may further provide a terminal that includes the starting unit 15 and the processing unit 16 shown in FIG. 12. The terminal may obtain the secondary TA of the secondary cell by using the method for obtaining a TA according to the embodiment of the present invention.

On the basis of the previous embodiment, a random access timer 14 may be set. If the receiving unit 11 does not receive a random access command, which is sent by the base station, within a duration set by the random access timer 14, the random access unit 12 may still use the secondary cell as a reference cell and initiate a random access procedure on the secondary cell or another secondary cell that shares the same secondary TA with the secondary cell and has a PRACH resource. In this case, the TA received by the obtaining unit 13 in the random access procedure and is sent by the base station is a secondary TA.

The terminal provided in the embodiment of the present invention is a device that executes the method for obtaining a secondary timing advance according to embodiments of the present invention and corresponds to the method for obtaining a secondary timing advance according to embodiments of the present invention. For the specific process for the terminal to execute the method for obtaining a secondary timing advance, reference may be made to the method embodiments, and details are not provided herein.

In the embodiment of the present invention, after the terminal receives the secondary cell activation command sent by the base station or after the secondary cell is activated, the terminal initiates a random access procedure to obtain the secondary timing advance, thereby saving signaling overhead and system resources.

Figure 13:
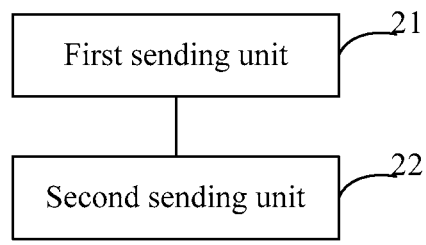
FIG. 13 is a schematic structural diagram of a base station according to an embodiment of the present invention.

FIG. 13 is a structural schematic diagram of a base station according to an embodiment of the present invention. The base station provided in the embodiment of the present invention may be applied to the foregoing method embodiments of the present invention. As shown in FIG. 13, the base station includes a first sending unit 21 and a second sending unit 22.

The first sending unit 21 is configured to send a secondary cell activation command to a terminal.

The second sending unit 22 is configured to send a TA to the terminal in a random access procedure according to random access initiated by the terminal, where the random access is initiated by the terminal if a secondary TAT of a secondary cell does not run after the terminal receives the secondary cell activation command or after it is confirmed according to the secondary cell activation command that the secondary cell is activated; and the secondary TA of the secondary cell is different from a primary TA of a primary cell.

In this embodiment, a TA is sent to the terminal through the second sending unit 22 so that the terminal may obtain a secondary TA.

The first sending unit 21 is further configured to send a random access command to the terminal before the terminal initiates a random access procedure, so that the terminal uses a cell carrying the random access command as a reference cell and initiates a random access procedure on the cell carrying the random access command; if the random access command specifies a reference cell, the terminal initiates a random access procedure on the secondary cell according to the reference cell specified in the random access command.

The TA sent to the terminal in the random access procedure is the secondary TA.

The first sending unit 21 is further configured to send a random access command to the terminal before the terminal initiates a random access procedure, so that the terminal uses the primary cell as a reference cell and initiates a random access procedure on the secondary cell, or so that the terminal uses the secondary cell as a reference cell and initiates a random access procedure on the primary cell.

In this embodiment, the terminal may be a terminal provided in embodiments shown in FIG. 11 and FIG. 12.

The base station provided in the embodiment of the present invention is a device that executes the method for obtaining a secondary timing advance according to embodiments of the present invention and corresponds to the method for obtaining a secondary timing advance according to embodiments of the present invention. For the specific process for the base station to execute the method for obtaining a secondary timing advance, reference may be made to the method embodiments, and details are not provided herein.

In the embodiment of the present invention, after a secondary cell activation command sent by the base station is received or after a secondary cell is activated, the base station initiates a random access procedure to obtain a secondary timing advance, thereby saving signaling overhead and system resources.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that modifications may still be made to the technical solutions described in the foregoing embodiments, or equivalent replacements may be made to some technical features thereof, without departing from the scope of the technical solutions of the embodiments of the present invention.

What is claimed is:

1. A method for obtaining a secondary timing advance (TA), the method comprising:
    initiating, by a terminal, a random access procedure, when a secondary cell is activated, a secondary time alignment timer (TAT) of the secondary cell does not run, and the terminal receives a random access command from a base station; and
    obtaining, by the terminal, a secondary TA of the secondary cell according to a TA received by the terminal in the random access procedure;
    wherein the secondary TA of the secondary cell and a primary TA of a primary cell do not belong to a TA group.

2. The method according to claim 1, wherein the secondary TA of the secondary cell is the TA received by the terminal in the random access procedure.

3. The method according to claim 1, the method further comprising:
    starting, by the terminal, the secondary TAT of the secondary cell when the secondary TA is obtained by the terminal; and
    stopping, by the terminal, uplink transmission on the secondary cell, when the secondary TAT expires.

4. The method according to claim 1, before the initiating, by a terminal, the random access procedure, the method further comprising:
    receiving, by the terminal, a secondary cell activation command from a base station, wherein the secondary cell activation command is used for activating the secondary cell.

5. A terminal, comprising:
    a receiver, configured to receive a random access command sent by a base station;

a processor, configured to initiate a random access procedure when a secondary cell is activated, a secondary time alignment timer (TAT) of the secondary cell does not run and the receiver receives the random access command; and the processor, further configured to obtain a secondary timing advance (TA) of the secondary cell according to a TA received by the terminal in the random access procedure;

wherein the secondary TA of the secondary cell and a primary TA of a primary cell do not belong to a TA group.

6. The terminal according to claim 5, wherein the secondary TA obtained by the processor is the TA received by the terminal in the random access procedure.

7. The terminal according to claim 5, wherein, the processor is further configured to start the secondary TAT according to the secondary TA obtained by the processor and stop uplink transmission on the secondary cell, when the secondary TAT expires.

8. The terminal according to claim 5, wherein the receiver is further configured to receive a secondary cell activation command sent from a base station before the processor initiates the random access procedure, and the secondary cell activation command is used for activating the secondary cell.

9. A method for obtaining a secondary timing advance (TA), the method comprising:

sending, by a base station, a random access command to a terminal;

sending, by the base station, a TA to the terminal in a random access procedure, wherein the procedure is initiated by the terminal when a secondary cell is activated, a secondary time alignment timer (TAT) of the secondary cell does not run and the terminal receives the random access command;

wherein the TA sent by the base station in the random procedure is used for the terminal obtaining a secondary TA of the secondary cell; the secondary TA of the secondary cell and a primary TA of a primary cell do not belong to a TA group.

10. The method according to claim 9, wherein the TA sent by the base station in the random access procedure is the secondary TA of the secondary cell.

11. The method according to claim 9, before the random access procedure initiated by the terminal, the method further comprising:

sending, by the base station, a secondary cell activation command to the terminal, wherein the secondary cell activation command is used for activating the secondary cell.

12. A base station, comprising:

a transmitter, configured to send a random access command to a terminal; and the transmitter, further configured to send a timing advance (TA) to the terminal in a random access procedure, wherein the procedure is initiated by the terminal when a secondary cell is activated, a secondary time alignment timer (TAT) of the secondary cell does not run and the terminal receives the random access command;

wherein the TA sent by the base station in the random procedure is used for the terminal obtaining a secondary TA of the secondary cell; the secondary TA of the secondary cell and a primary TA of a primary cell do not belong to a TA group.

13. The base station according to claim 12, wherein the TA sent by the base station in the random access procedure is the secondary TA of the secondary cell.

14. The base station according to claim 12, wherein the transmitter is further configured to send a secondary cell activation command to the terminal, and the secondary cell activation command is used for activating the secondary cell.

* * * * *